United States Patent
Biermann et al.

(10) Patent No.: US 7,001,298 B2
(45) Date of Patent: Feb. 21, 2006

(54) CLUTCH SYSTEM FOR A TRANSMISSION

(75) Inventors: Eberhard Biermann, Ravensburg (DE); Peter Tiesler, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 81 days.

(21) Appl. No.: 10/679,551

(22) Filed: Oct. 6, 2003

(65) Prior Publication Data

US 2004/0077449 A1    Apr. 22, 2004

(30) Foreign Application Priority Data

Oct. 16, 2002  (DE)  ................................ 102 48 172

(51) Int. Cl.
*F16H 31/00*    (2006.01)
*F16D 13/60*    (2006.01)

(52) U.S. Cl. .................... 475/116; 475/127; 192/85 R; 192/113.36

(58) Field of Classification Search ................ 475/116, 475/127; 192/3.52, 85 R, 70.12, 109 R, 192/113.1, 113.36
See application file for complete search history.

(56) References Cited

U.S. PATENT DOCUMENTS

| | | | |
|---|---|---|---|
| 3,255,642 A * | 6/1966 | Christenson et al. ......... 477/59 |
| 4,509,627 A | 4/1985 | Kawamoto ................ 192/85 F |
| 4,957,195 A * | 9/1990 | Kano et al. .............. 192/106 F |
| 5,630,492 A * | 5/1997 | Yoshikawa et al. ...... 192/106 F |
| 5,647,467 A | 7/1997 | Yamauchi ................ 192/87.11 |
| 5,865,289 A | 2/1999 | Ishimaru .................. 192/87.11 |
| 5,887,690 A | 3/1999 | Haupt ...................... 192/87.11 |
| 6,007,448 A * | 12/1999 | Hotta et al. ................. 475/159 |
| 6,044,948 A | 4/2000 | Okada et al. .............. 192/70.2 |
| 6,059,682 A * | 5/2000 | Friedmann et al. ......... 475/159 |
| 6,120,410 A | 9/2000 | Taniguchi et al. .......... 475/285 |
| 6,382,382 B1 | 5/2002 | Avny et al. .............. 192/106 F |
| 6,481,553 B1 * | 11/2002 | Lee .......................... 192/70.2 |
| 6,705,447 B1 * | 3/2004 | Gorman et al. ......... 192/85 AA |
| 6,824,494 B1 * | 11/2004 | Yasuda et al. .............. 475/327 |
| 2004/0173174 A1 * | 9/2004 | Sugino et al. ......... 123/179.28 |
| 2005/0026741 A1 * | 2/2005 | Diosi et al. ................. 475/278 |

FOREIGN PATENT DOCUMENTS

| | | |
|---|---|---|
| DE | 41 36 040 C1 | 1/1993 |
| DE | 44 15 664 A1 | 9/1995 |
| DE | 198 00 490 A1 | 8/1998 |
| DE | 197 00 635 C2 | 6/2002 |
| JP | 2002286119 A * | 10/2002 |
| JP | 2003097678 A * | 4/2003 |

* cited by examiner

*Primary Examiner*—Tisha Lewis
(74) *Attorney, Agent, or Firm*—Davis & Bujold, P.L.L.C.

(57) ABSTRACT

A clutch system for a transmission with one clutch (1) which comprises one disc carrier (3) and one servo mechanism (10) situated within the disc carrier (3) with dynamic pressure balance for actuating the clutch (1) and with a planet carrier of a planetary gear set (26) the spider plate (27) of which abuts in axial direction on a pressure balance space (15) of the dynamic pressure balance of the servo mechanism (10). It is proposed that the spider plate (27) be non-torsionally connected with the disc carrier (3) and be axially fixed via a locking element (31) on the disc carrier (3) in a manner such that the servo mechanism (10) is prestressed against the disc carrier (3) by the axial fixing of the spider plate (27).

20 Claims, 5 Drawing Sheets

Fig. 6

CLUTCH SYSTEM FOR A TRANSMISSION

This application claims priority from German Application Serial No. 102 48 172.5 filed Oct. 16. 2002.

FIELD OF THE INVENTION

The invention relates to a clutch system for a transmission having one clutch which comprises one disc carrier. Situated within the disc carrier, one servo mechanism with dynamic pressure balance for actuating the clutch the same as one planet carrier of a planetary gear set, the spider plate of which abuts in axial direction on a pressure balance space of the dynamic pressure balance of the servo mechanism.

BACKGROUND OF THE INVENTION

Arrangements of parts of transmissions, having one clutch and one planetary gear set situated adjacent thereto, are widely known from the prior art. U.S. Pat. No. 6,120,410, for example, discloses a clutch system drafted with one multi-disc clutch in the cup-shaped outer disc carrier of which there are situated discs, one servo mechanism with one clutch, one annular spring set for resetting the piston and one baffle plate of a dynamic pressure balance. Radially below the disc set, a planetary gear set is located. One pressure balance space of the dynamic pressure balance of the clutch is formed by the baffle plate and the piston. A pressure space of the clutch is accordingly situated upon the side of the piston opposite the planetary gear set. The recoil force of the annular spring set braced between piston and baffle plate supports itself on a guard ring which fixes the baffle plate axially opposite the outer disc carrier. A lubricant is supplied to the pressure balance space via a lubrication hole in the hub area of the outer disc carrier.

One spider plate of a planet carrier of the planetary gear set abuts axially on the pressure balance space of the clutch. The spider plate is tensionally firmly connected on its outer diameter with an inner disc carrier of the clutch. In the spider plate planet, shafts are inserted upon which the planetary gears are mounted. For planetary gear lubrication, the planetary shafts have each one central hole designed as blind hole and one radial hole oriented toward the center of the respective planetary gear. The lubricant is fed to the planet shafts from the side of the spider plate which abuts axially on the pressure balance space of the clutch. To improve the axial introduction of the lubricant in the central hole of the planet shafts, a lubrication baffle sheet is provided which is fastened on the spider plate upon a diameter above the planet shafts upon the side of the spider plate facing the pressure balance space of the clutch. The lubricant for lubricating the planetary gears is supplied not via the lubrication hole of the disc carrier through which the pressure balance space is supplied with lubricant but via a low-friction bearing by which the disc carrier is supported on a stationary transmission housing. The amount of lubricant supplied to the planetary gears is, therefore, approximately the leakage amount of said low-friction bearing.

In this clutch system of U.S. Pat. No. 6,120,410, outer disc carrier, piston, annular spring set, baffle plate anti discs of the clutch form one pre-assemblable clutch unit that can be installed as whole in the transmission. The planetary gearset pre-completed with planet shafts, planetary gears, spider plate and one inner disc carrier forms a separate unit which only after assembly of the clutch unit in the transmission can also be mounted in the transmission. To maintain a defined installation dimension of the planet carrier relative to the baffle plate of the clutch, a spacer element is provided which is designed as bearing disc because of the possible relative speed between inner disc carrier and baffle plate. The planet carrier itself is rot axially fixed on the outer disc carrier.

The needed axial installation space of the clutch system disclosed in U.S. Pat. No. 6,120,410 is relatively large due to the special arrangement of parts of clutch and adjacent planetary gear set, the same as to the lubricant supply constructed for the dynamic pressure balance of the clutch and for planetary gear lubrication.

Departing from the prior art, the problem on which this invention is based is to further develop a clutch system for a transmission with regard to axial length and with regard to ease of assembly which has one clutch with one disc carrier and, situated within the disc carrier, one servo mechanism with dynamic pressure balance; the same as one planet carrier of a planetary gear set, the spider plate of which abuts in axial direction on a pressure balance space of the dynamic pressure balance of the servo mechanism.

SUMMARY OF THE INVENTION

This problem is solved by a clutch system having the features of claim 1. Advantageous developments of the invention result from the sub-claims.

The clutch system accordingly comprises one transmission, one clutch with one disc carrier and one servo mechanism located within the disc carrier and having dynamic pressure balance for actuating the clutch and one planet carrier of a planetary gear set; the spider plate of which abuts in axial direction on a pressure balance space of the dynamic pressure balance of the servo mechanism. According to the invention, the spider plate is non-torsionally connected here with the disc carrier and axially fixed on the disc carrier, via a locking element, in a manner such that the servo mechanism is pre-stressed against the disc carrier by the axial fixing of the spider plate.

In a first development of the axial fixing of the spider plate, one recoil spring of the servo mechanism, acting upon one piston of the servo mechanism, supports itself directly on the spider plate.

In a second development of the axial fixing of the spider plate, the recoil spring of the servo mechanism, acting upon the piston of the servo mechanism, supports itself directly on a baffle plate of the pressure balance space which is stationary relative to the spider plate, the baffle plate, in turn, supporting itself directly on the spider plate.

Discs, disc carrier, servo mechanism and pressure balance space of the clutch, together with a pre-completed planet carrier of the planetary gear set, preferably form one pre-assemblable unit that can be installed as whole in the transmission, the pre-completed planet carrier having the spider plate, the planet shafts inserted in the spider plate and planetary gears mounted upon the planet shafts. The disc carrier is preferably designed as outer disc carrier, but can also be designed as inner disc carrier.

In a preferred development, a common lubricant supply is provided for lubricant supply of the pressure balance space and of a planetary gear lubrication. Upon the side of the spider plate facing the pressure balance space, axially between the spider plate and a contact face of the disc carrier, a molded spacer disc is braced which spatially separates the pressure balance space from a lubricant chamber of the planetary gear lubrication on the spider plate side and to form said lubricant chamber abuts at least extensively oil tight on a radius above the planet shafts opposite the spider plate. To implement an axial length as small as possible, the molded spacer disc has distributed on its periphery axially stamped corrugations of radial orientation whose grooves formed by the axial stamping are in communication either with the pressure balance space or with the lubricant chamber. The common lubricant supply for the dynamic pressure balance of the clutch and for lubrication of the planet gears takes place in an area of the inner diameter of the molded spacer disc, the lubricant for planetary gears lubrication being fed from the lubricant chamber to the planetary gears via planet shafts inserted in the spider plate.

In a first constructional development of the pressure balance space this is formed by the molded spacer disc as axially stationary baffle plate and by a cup-shaped section of the axially movable piston of the servo mechanism.

In a second constructional development of the pressure balance space, this can also be formed by an axially stationary wall consisting of the molded spacer disc and one cylindrical section of the spider plate and by a cup-shaped section of the axially movable piston of the servo mechanism.

Both in the first and in the second proposed constructional developments of the pressure balance space, the molded spacer disc can have an overflow edge acting between pressure balance space and lubricant chamber and being disposed relative to the common lubricant supply so that the lubricant flowing on the inner diameter of the molded spacer disc first fills at least extensively the pressure balance space of the clutch and that the lubricant can be passed via the overflow edge of the axially molded spacer disc into the lubricant chamber of the planetary gear lubrication only when the pressure balance space is filled.

In one other development of the distribution of the lubricant supplied between pressure balance space and planetary gear lubrication, it can be provided that in the first and in the second proposed constructional developments of the pressure balance space, the molded spacer disc can be disposed relative to the common lubricant supply so that the lubricant flowing on the inner diameter of the molded spacer disc is fed partly to the pressure balance space of the clutch and partly to the lubricant chamber of the planetary gear lubrication.

In a third constructional development of the pressure compensation space, it is provided that the pressure balance space be formed by the spider plate as axially stationary wall and by a cup-shaped section of the axially movable piston of the servo mechanism, the molded spacer disc being eliminated. In this case, the whole amount of lubricant supplied by the common lubricant supply for the dynamic pressure balance and the planetary gears lubrication is first passed into the pressure balance space. The lubricant for the planetary gears lubrication arrives directly from the pressure balance space to the planetary gears via holes of the respective planet shafts inserted in the spider plate and upon which the planetary gears are supported. To achieve a defined lubricant distribution, it is possible to insert in a central hole of the respective planetary shaft, for example, one diaphragm, or to design this central hole as stepped hole.

BRIEF DESCRIPTION OF THE DRAWINGS

The invention will now be described, by way of example, with reference to the accompanying drawings in which.

Structural elements of the same design or similar function are provided the same reference numerals.

DETAILED DESCRIPTION OF THE INVENTION

Figure 1:
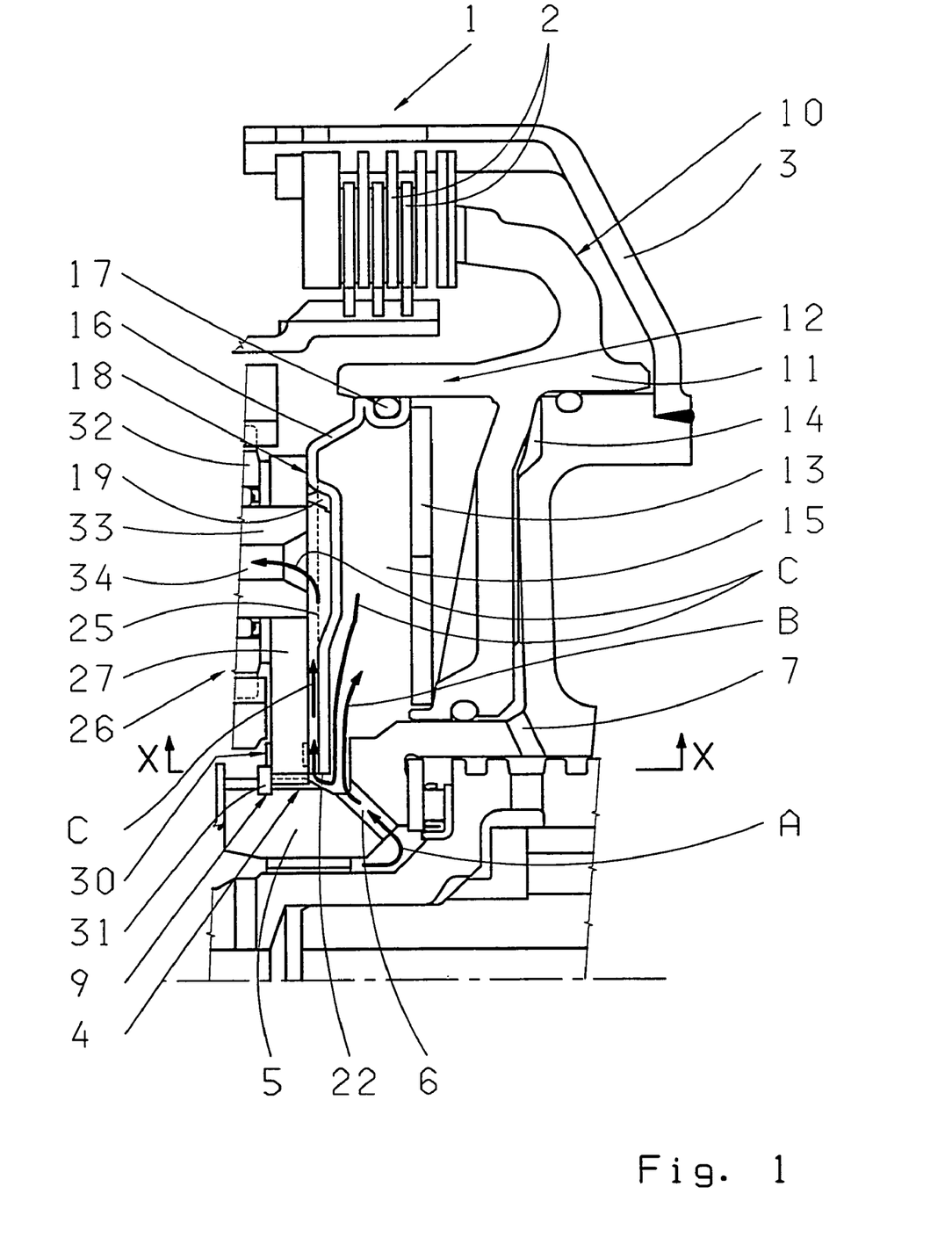
FIG. 1 a sectional representation of a first exemplary inventive clutch system.

In FIG. 1 is shown in section an exemplary first inventive clutch system comprising one clutch 1 and one planetary gear set 26 located adjacent the clutch 1. Discs 2 of the clutch 1 designed as outer and lining discs are situated within a cup-shaped disc carrier 3 of the clutch 1 designed as outer disc carrier. The disc carrier 3 shown as being made of multiple parts in the example can obviously be also designed in one piece. Likewise situated within the cup-shaped disc carrier 3 is a servo mechanism 10 of the clutch 1 for actuating the discs 2. To this end the servo mechanism 10 has one piston 11 which, together with an adequately designed wall of the disc carrier 3, form a pressure space 14. A loading with pressure of said pressure space 14 via a pressure supply hole 7 of the disc carrier 3 produces, after overcoming a recoil force of a recoil spring 13 exemplary made as cup spring, an axial displacement of the piston 11 toward the discs 2. On the side of the piston 11 opposite the pressure space 14 a pressure balance space 15 is situated which acts upon the piston 11 and by way of which is at least approximately balanced by a dynamic pressure of the clutch 1 appearing as result of a clutch rotation. To this end the pressure balance space 15 is filled with lubricant which is fed via a lubrication hole 6 situated in a hub 5 of the disc carrier 3. The pressure balance space 15 which in the example shown is located radially beneath the discs 2 is formed, in length-saving design, by a molded spacer disc 16 as axially stationary baffle plate and by a cup-shaped section 12 of the axially displaceable piston 11 of the servo mechanism 10. On its outer diameter the molded spacer disc 16 is axially movably sealed via seal ring 17 against the cup-shaped section 12 of the piston 11.

On the side of the clutch 1 facing the servo mechanism 10 is situated a spider plate 27 of a planet carrier of the planetary gear set 26 axially directly abutting on the molded spacer disc that forms the pressure balance space 15. According to the invention the spider plate 27 is here non-torsionally (with positive fit) connected in the area of the hub 5 with the disc carrier 3 via a spline section 4 of the disc carrier 3 and axially fixed via a locking element 31 on the disc carrier 3 in a manner such that the servo mechanism 10 is prestressed against the disc carrier 3 by the axial fixing of the spider plate 27. According to the invention the recoil spring 13 of the servo mechanism 10 which acts upon the piston 11 of the servo mechanism 10 supports itself directly on the molded spacer disc 16 stationary relative to the spider plate 27, the molded spacer disc 16 in turn supporting itself directly on the spider plate 27. The locking element 31 designed, for example, as guard ring or as divided locking disc, engages in a radial groove 9 of the hub 5 of the disc carrier 3. The spring tension of the recoil spring 13 of the servo mechanism 10 therefore produces the axial prestress of the spider plate 27.

Planetary gears 32 of the planetary gear set 26 upon which is situated the side of the spider plate 27 remote from the clutch. The planet shafts 33 inserted in the spider plate 27 are provided to support the planetary gears 32. By virtue of said arrangement of the planetary gear set 26 relative to the clutch 1 and of the design of the disc carrier 3 as outer disc carrier, the actuation force of the servo mechanism acts axially in direction of the planetary gear set 26, seen from the pressure space 14 of the clutch 1.

In another development the disc carrier can also be designed as inner disc carrier, the spider plate being without change non-torsionally connected with the hub of the disc carrier and axially abutting on the pressure balance space. In this case the actuation force of the servo mechanism 10 acts axially in direction contrary to the planetary gear set 26, seen from the pressure space 15 of the clutch 1.

For lubrication of the planetary gears, the planet shafts 33 have each one central hole 34 into which the lubricant is passed from the side of the clutch 1 facing the pressure balance space 15. Via at least one radially oriented hole—not shown in detail—of the relevant planet shaft, the lubricant arrives from the respective central hole 34 at the bearing of the planetary gears 32.

As can be seen in FIG. 1, the molded spacer disc 16 spatially separates the pressure balance space 15 from a lubricant chamber 25 of the planetary gear lubrication on the spider plate side. To form said lubricant chamber 25, the molded spacer disc 16 abuts at least extensively oil tight on a radius above the planet shafts 33 opposite the spider plate 27. In the example shown, on this sealing face 18 of the spacer disc 16 is provided one seal 19 designed, for example, as round sealing ring, lipped sealing ring, or gasket and it can also be pasted or vulcanized on the spacer disc 16 or on the spider plate 27. The lubricant existing in the lubricant chamber 25 is fed via the central holes 34 of the planet shafts 33 (and the radially oriented holes, not shown of the planetary shafts) to the bearing of the planetary gears 32.

For the dynamic clutch pressure balance and the planetary gear lubrication, a common lubricant supply A is provided which is located in the area of the inner diameter of the molded spacer disc 16, the lubricant being supplied via the already mentioned lubrication hole 6 of the disc carrier 3. The lubricant flow into the pressure balance space 15 is here designated with B, the lubricant flow to the lubricant chamber 15 of the planetary gear lubrication being designated with C. According to the invention, to achieve the smallest possible axial length of the clutch system, the molded spacer disc 16 has distributed on its periphery axially stamped are connected either with the lubricant chamber 25 or with the pressure balance space 15.

Figure 2:
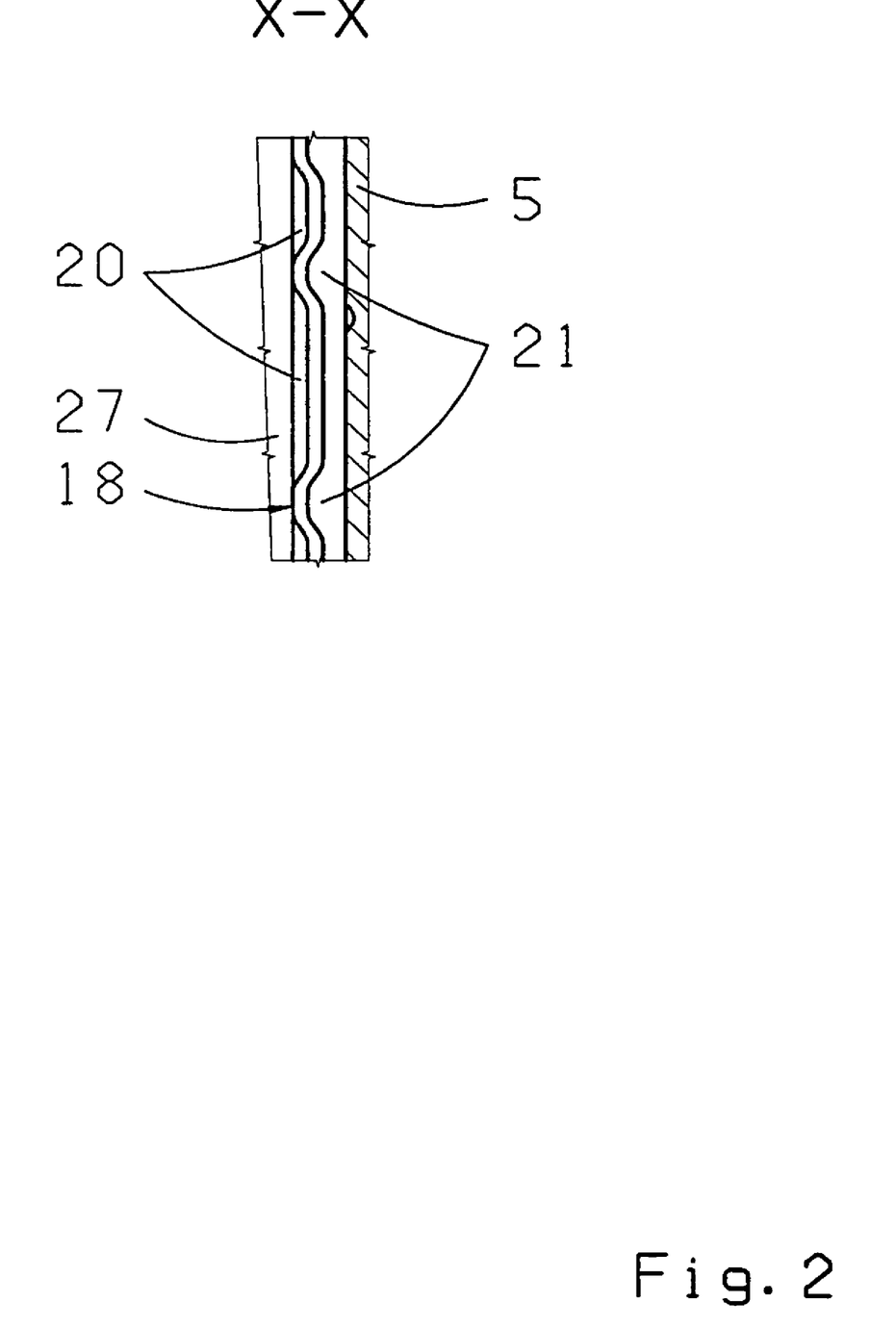
FIG. 2 a section "X—X" according to FIG. 1.

In FIG. 2, for better understanding, a section "X—X" is shown through the hub 5 according to FIG. 1 with the molded spacer disc 16 and the spider plate 27, the molded spacer disc 16 having grooves 20 on the side of the lubricant chamber and on the side of the pressure balance space grooves 21 of the stamped corrugation, the same as the contact face 18 on the spider plate 27.

In the Example shown in FIG. 1, the molded spacer disc 16 is disposed relative to the lubrication hole 6 of the disc carrier 3 so that the lubricant fed is first conveyed to the pressure balance space 15, at least extensively, via the grooves 21 of the stamped corrugation of the spacer disc 16 which grooves are on the side of the pressure balance space (lubricant flow A). Only when the pressure balance space 15 is filled, does the lubricant flow radially beneath an overflow edge 22 of the molded spacer disc 16 across the pressure balance space 15 into the grooves 20 of the stamped corrugation of the spacer disc 16, which grooves are on the side of the lubricant chamber, and thus into the lubricant chamber 26 (lubricant flow B). In this way is ensured a high functional priority of the dynamic clutch pressure balance compared to the planetary gear lubrication. Such an arrangement is specially advantageous when a short-term deficient lubrication of the planetary gear set is uncritical, but an interruption in operation of the clutch absolutely has to be prevented.

In the first exemplary clutch system described, the discs 2, the disc carrier 3, the servo mechanism 10 and the molded spacer disc 16 that forms the pressure balance space, together with the pre-completed planet carrier of the planetary gear 26, advantageously form a pre-assemblable unit of minimized axial length which can be installed as whole in the transmission. The pre-completed planet carrier has here the spider plate 27, the planet shafts inserted in the spider plate 27 and the planetary gears mounted on the planet shafts 33 and prestresses—as described—the servo mechanism 10 relative to the disc carrier 3.

To increase the safety—specially at high speeds of the clutch—the locking element 31 through which the spider plate 27 is prestressed against the hub 5 of the disc carrier 3 has in addition one radially acting securing device. To this end, on the spider plate 27 an axial embossing 30 is provided which extends upon a diameter directly above the locking element 31 axially in direction of the locking element 31. In assembled state of the unit the embossing 30 engages axially via the locking element 31 so that the locking element 31 is fixed in radial direction in the groove 9 of the hub 5 of the disc carrier 3. Such an axial embossing 30 of the spider plate 27 can be created, for example, by a simple pressure operation. In order to assemble the locking element 31 in the groove 9, the spider plate 27 is displaced upon the hub 4 of the disc carrier 3 in direction of the servo mechanism 10 by a defined path beyond the groove 9 and thereby produces the required free play for insertion of the locking element 31 in the corresponding groove 9. After the assembly the recoil spring 13 of the servo mechanism 10 presses the spider plate 27 back toward the locking element 31.

Figure 3:
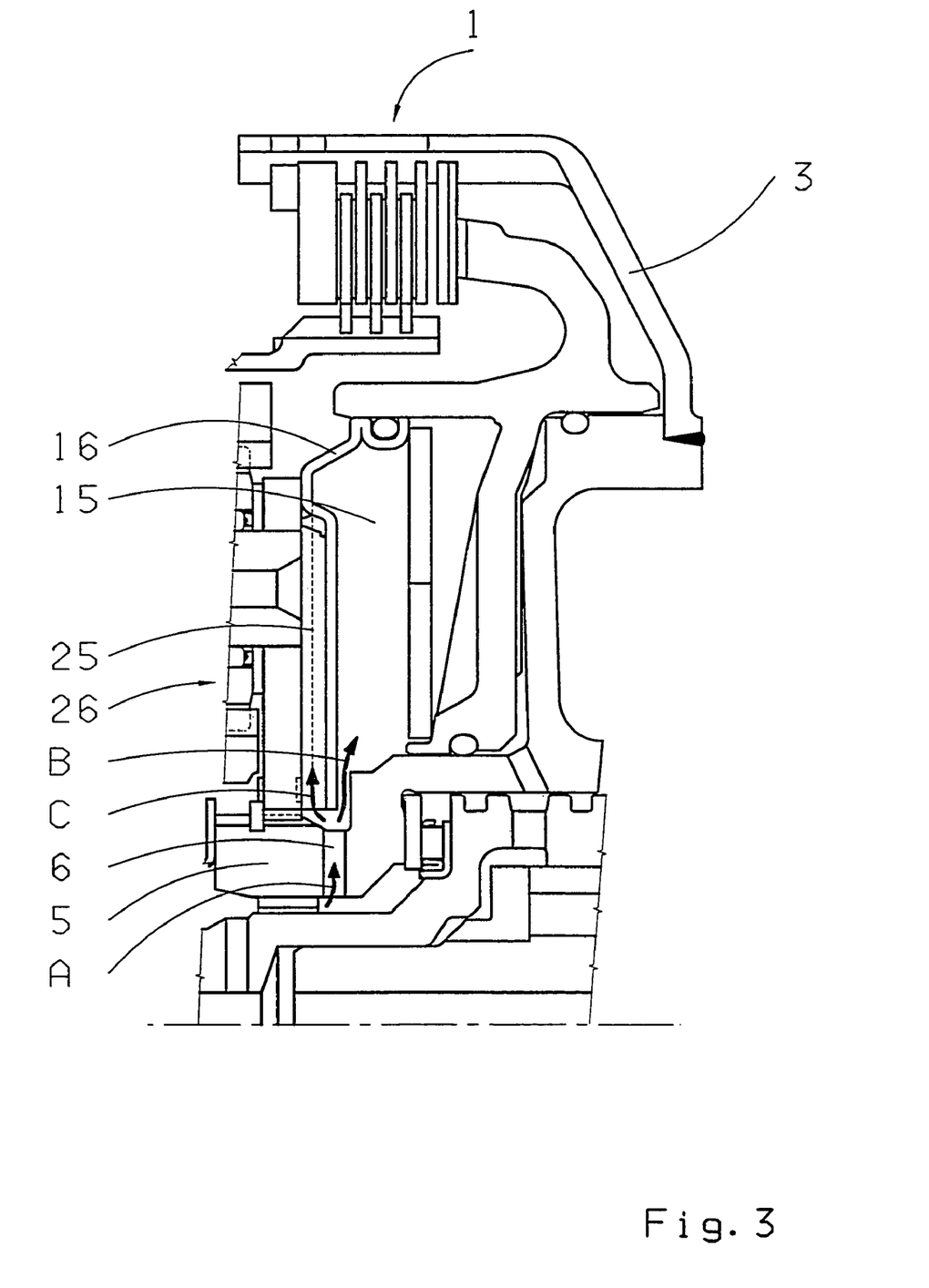
FIG. 3 a variant of lubricant supply of the first clutch system.

FIG. 3 shows a variant for the lubricant supply to the pressure balance space 15 of the clutch 1 and to the lubricant chamber 25 of the planetary gear lubrication. Except for the constructional development of the molded spacer disc 16 and the spacial position of the lubrication hole 6 in the area of the hub 5 of the disc carrier 3, the clutch system shown in FIG. 3 corresponds to the first exemplary clutch system explained before with reference to FIG. 1. A common lubricant supply A for the dynamic clutch pressure balance and the planetary gear lubrication is provided without change. The lubricant is supplied via the lubrication hole 6 of the disc carrier 3 in the area of the inner diameter of the molded spacer disc 16. Unlike in FIG. 1, the molded spacer disc 16 is now disposed relative to the lubrication hole 6 of the disc carrier 3 so that the lubricant flowing on the inner diameter of the molded spacer disc 16 is fed partly to the pressure balance space 15 of the clutch 1 (lubricant flow B) and partly to the lubricant chamber 25 of the planetary gear lubrication of the planetary gear set 26 (lubricant flow C).

It is ensured in this manner that dynamic clutch pressure balance and planetary lubrication be supplied with lubricant with equal priority.

In another development of the lubricant supply with the same priority for the dynamic clutch pressure balance and planetary gear lubrication there can be provided also in the hub of the disc carrier, for example, several lubrication holes disposed so that a first lubrication hole discharges in the pressure balance space of the dynamic clutch pressure balance and a second lubrication hole in the lubricant chamber of the planetary gear lubrication.

A second exemplary clutch system according to the invention is now explained with reference to FIG. 4. With regard to fundamental and functional construction, this second clutch system corresponds in essence to the first clutch system described above in detail with reference to FIG. 1. The spider plate 27 of the planetary gearset 26 abuts without charge on the pressure balance space 15 of the clutch 1. Unlike FIG. 1, the pressure balance space 15 is now formed by the cup-shaped section 12 of the axially movable piston 11 of the servo mechanism 10 and an axially stationary baffle plate consisting of the molded spacer disc 16 and one cylindrical section 28 of the spider plate 27. The cylindrical section 28 of the spider plate 27 is axially movably sealed on its outer diameter by a seal ring 29 against the cup-shaped section 12 of the piston 11. The molded spacer disc 16 forms are extensively vertical wall opposite the piston 11 which wall abuts axially directly on the spider plate 27 and is sealed, at least to a great extent oil tight, opposite the spider plate 27 on a diameter above th planet shafts 33 (sealing surface 18, seal 19). The molded spacer disc spatially separates —like in FIG. 1 —the pressure balance space 15 from the lubricant chamber 25 on the side of tie spider plate.

Without change the spider plate 27 is non-torsionally (positively) connected with the disc carrier 3 via the spline section 4 of the disc carrier 3 in the area of the hub 5 of the disc carrier 3 and axially fixed via the locking element 31 on the disc carrier 3 in such a manner that the servo mechanism 10 is prestressed against the disc carrier 3 by the axial fixing of the spider plate 27. Differently from FIG. 1 the recoil spring 13 of the servo mechanism 10 that acts upon the piston 11 of the servo mechanism 10 now supports itself directly on the spider plate 27. The spring tension of the recoil spring 13 of the servo mechanism 10 produces at the same time without change the axial prestress of the spider plate 27. The spring tension of the recoil spring 13 of the servo mechanism 10 produces at the same time without change the axial prestress of the spider plate 27.

Figure 4:
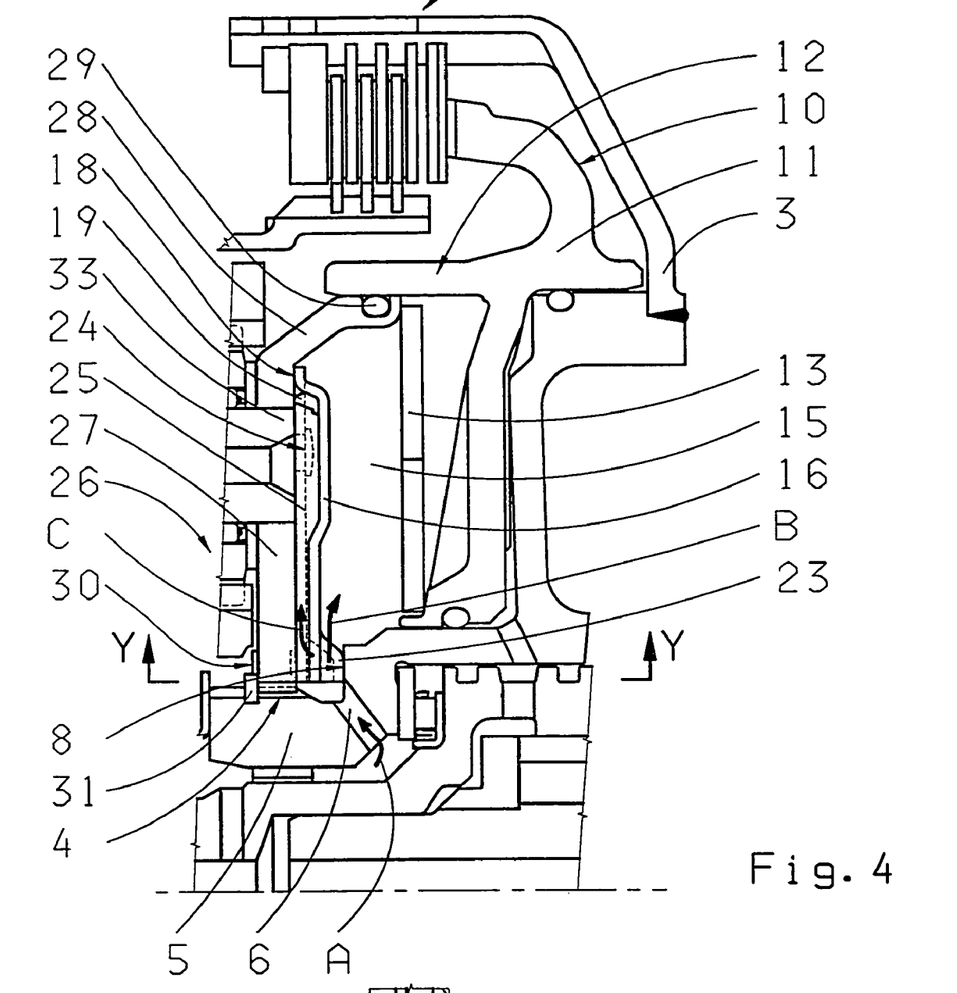
FIG. 4 a sectional representation of a second exemplary inventive clutch system.

For axial fixing of the molded spacer disc 16 opposite the spider plate 27, a riveting 24 is provided in the example shown in FIG. 4, but other known fastening means like spring elastic clips or a pasting can also be provided.

The same as in the first inventive clutch system described above with reference to FIG. 1, to increase the safety, specially at high speed of the clutch, there is also additionally provided in the second inventive clutch system a radially acting protection for the locking element 31 through which the spider plate 27 is prestressed opposite the hub 5 of the disc carrier 3. As can be seen in FIG. 4, to this end there is provided on the spider plate 27 an axial embossing 30 which extends upon a diameter directly above the locking element 31 axially in direction of the locking element 31. In the assembled state of the unit, the embossing 30 engages axially via the locking element 31 in a manner such that the locking element 31 is fixed in radial direction in its corresponding groove of the hub 5 of the disc carrier 3. To assemble the locking element 31 in the groove 9, the molded spacer disc 16—unlike in FIG. 1—has in the area of its inner diameter a section 23 resilient in axial direction which abuts on the contact face 8 of the hub 5 of the disc carrier 3. When the spider plate 27 is mounted on the hub 5 of the carrier 3, said resilient section 23 of the molded spacer disc 16 is reversibly compressed and the free play required for insertion of the locking element 31 in the corresponding groove 9 is created by the axial displacement of the spider plate 27 in direction of the servo mechanism 10 in a defined path beyond the groove 9. After assembly the recoil spring 13 of the servo mechanism 10 presses the spider pate 27 back toward the locking element 31.

Figure 5:
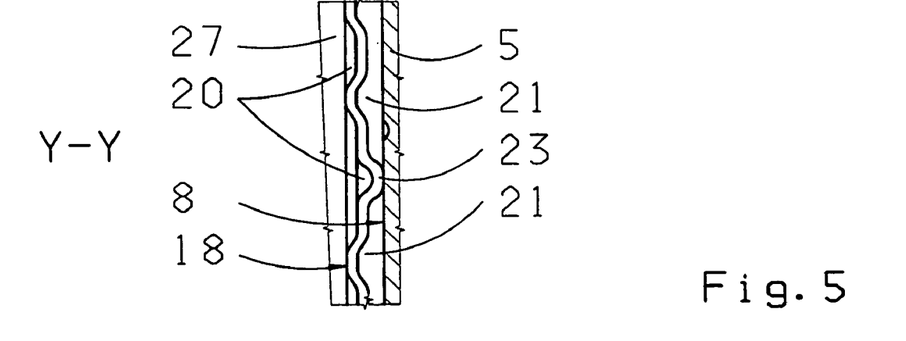
FIG. 5 a section "Y—Y" according to FIG. 4.

For better understanding there is shown in FIG. 5 a section "Y—Y" through the hub 5 of the disc carrier 3 according to FIG. 4 with the molded spacer disc 16, with the grooves 20 on the lubricant chamber side and the spider plate 27, the molded spacer disc 16 having the contact face 18 on the spider plate 27, the grooves 20 on the lubricant chamber side and the grooves 21 of the stamped corrugation on the side of the pressure balance space, the same as the resilient section 23 abutting on the contact face 8 of the hub 5.

The lubricant is fed to the pressure balance space 15 and to the lubricant chamber 25 via the lubrication hole 6 of the disc carrier 3 located in the hub 5 as common lubrication supply A in the area of the inner diameter of the molded spacer disc 16. At the same time the molded spacer disc 16 divides the lubricant current fed into the lubricant flow B for the dynamic clutch pressure balance and the lubricant flow C for lubrication of the planetary gears. The corresponding grooves of the axial corrugation of the molded spacer disc 16 are again designated with 21 (groove on the side of the pressure balance space) and 20 (groove on the side of the lubrication chamber).

Depending on the required priority of the lubricant supply between dynamic clutch pressure balance and planetary gear lubrication, the expert will suitably combine as needed the variants of the lubrication distribution described above with reference to FIG. 1 and FIG. 3 with the design of the pressure balance space according to FIG. 4.

A third exemplary clutch system according to the invention is now explained with reference to FIG. 6. Unlike the above described constructional developments the pressure balance space 15 of the clutch 1 is now formed by the cup-shaped section 12 of the piston 11 of the servo mechanism 10 of the clutch and the spider plate 27 of the planetary gear set 26 non-torsionally connected with the disc carrier 3 of the clutch 1. The spider plate has here in the area of its outer diameter—that is, on a diameter above the planet shafts 33 inserted in the spider plate 27—a cylindrical section 28 which extends axially in direction of the servo mechanism 10 of the clutch and is axially movably oil tight sealed again the cup-shaped section 12 of the piston 11 by a seal ring 29.

According to the invention, the recoil spring 13 of the servo mechanism 10 supports itself axially on the cylindrical section 28 of the spider plate 27, the spider plate 27 in turn supporting itself on the disc carrier 3 of the clutch 1 via the locking element 31 engaging in the groove 9 of the hub 5 of the disc carrier 3.

For lubricant supply of the dynamic pressure balance of the clutch 1 and of the planetary gear lubrication of the planetary gear set 26—like in the constructional developments according to FIG. 1 and to FIG. 5—a common lubricant supply A is provided which is effected via at least one lubrication hole 6 situated in the hub 5 of the disc carrier 3. The entire amount of lubricant is here conveyed to the pressure balance space 5 (lubricant flow B). The lubricant flow C to the planetary gear lubrication results from the pressure balance space 15 via the central holes 34 of the planet shafts 33 open in direction of the pressure balance space 15. For adjusting the amount of lubricant of the planetary gear lubrication one diaphragm 35 is inserted in each central hole 34 of the planet shafts 33. In another development the central holes 34 of the planet shafts 33 can each be designed also as stepped hole.

Figure 6:
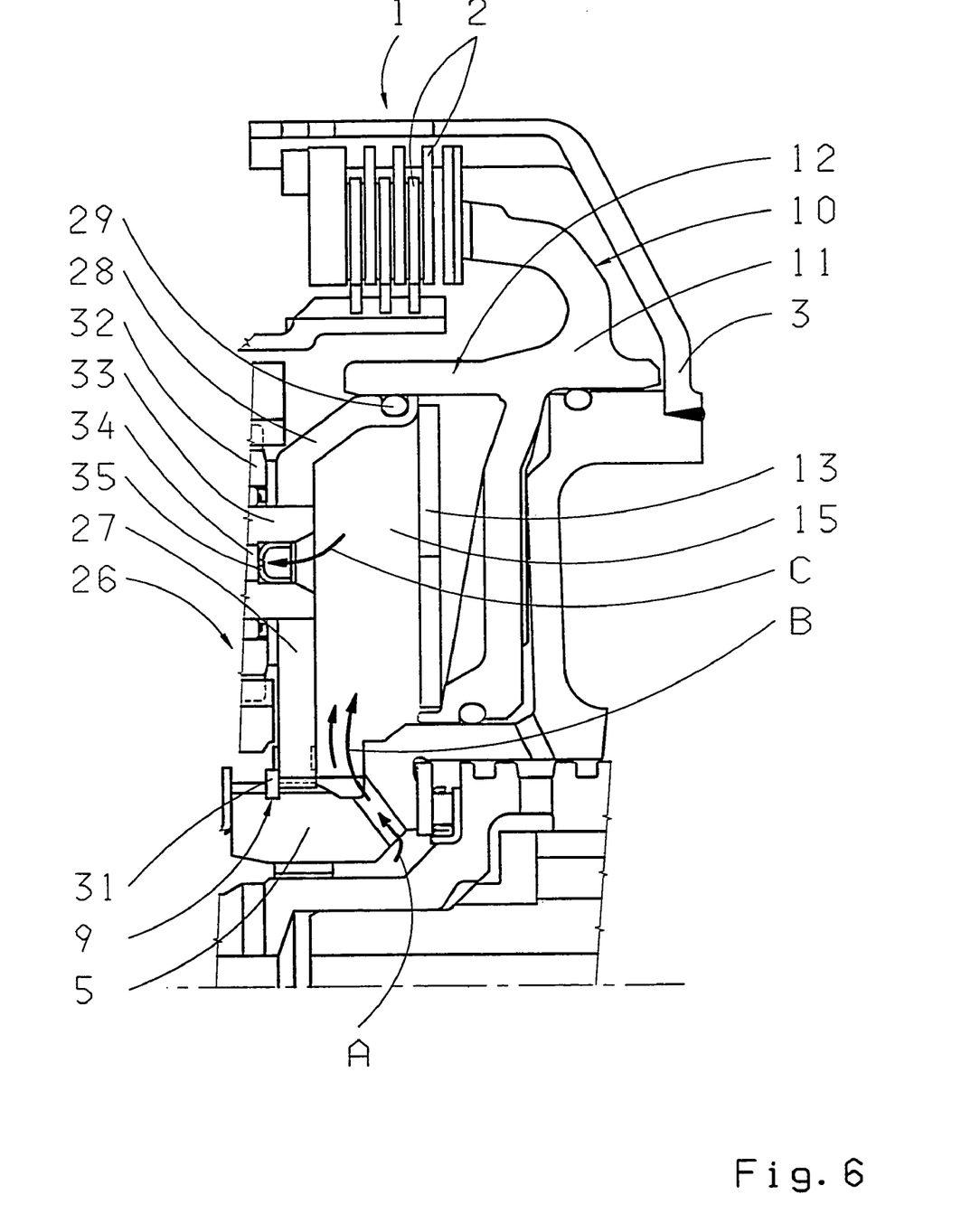
FIG. 6 a sectional representation of a third exemplary inventive clutch system.

As in the exemplary clutch systems according to FIG. 1 to FIG. 5, in the third inventive clutch system according to FIG. 6 the discs 2 of the clutch 1, the disc carrier 3, the servo mechanism 10, the pressure balance space 15, together with the pre-completed planet carrier of the planetary gear set 26, form a preassemblable unit which can be installed as one whole in the transmission, the pre-completed planet carrier having the spider plate 27, planet shafts 33 inserted in the spider plate 27 and the planetary gears 32 supported on the planet shafts 33.

REFERENCE NUMERALS

| | |
|---|---|
| 1 | clutch |
| 2 | discs of the clutch |
| 3 | disc carrier of the clutch |
| 4 | spline section of the disc carrier |
| 5 | hub of the disc carrier |
| 6 | lubrication hole of the disc carrier |
| 7 | pressure supply hole of the disc carrier |
| 8 | contact surface of he disc carrier |
| 9 | groove of the disc carrier |
| 10 | servo mechanism of the clutch |
| 11 | piston of the servo mechanism |
| 12 | cup-shaped section of the clutch |
| 13 | recoil spring of the servo mechanism |
| 14 | pressure space of the clutch |
| 15 | pressure balance space of the clutch |
| 16 | molded spacer disc |
| 17 | seal ring of the spacer disc |
| 18 | sealing surface of the spacer disc |
| 19 | seal of the spacer disc |
| 20 | groove of the spacer disc on the side of the lubricant chamber |
| 21 | groove of the spacer disc on the side of the pressure balance space |
| 22 | overflow edge of the spacer disc |
| 23 | resilient section of the spacer disc |
| 24 | riveting of the spacer disc on the spider plate |
| 25 | lubricant chamber of the planetary gear lubrication |
| 26 | planetary gear set |
| 27 | spider plate of the planetary gear set |
| 28 | cylindrical section of the spider plate |
| 29 | seal ring of the spider plate |
| 30 | axial embossing of the spider plate |
| 31 | locking element |
| 32 | planetary gear of the planetary gear set |
| 33 | planet shaft of the planetary gear set |
| 34 | central hole of the planet shaft |
| 35 | diaphragm |
| A | lubricant supply |
| B | lubricant flow to the pressure balance space |
| C | lubricant flow to the lubricant chamber |

The invention claimed is:

1. A clutch system for a transmission with a clutch (1), the clutch system comprising:
    a disc carrier (3); and
    a servo mechanism (10) situated within said disc carrier (3) and the servo mechanism (10) having dynamic pressure balance for actuating said clutch (1), a spider plate (27) supporting at least one planet shaft of a planetary gearset (26), the spider plate (27) forming an axial end wall for a pressure balance space (15) of said dynamic pressure balance of said servo mechanism (10),
    wherein said spider plate (27) is non-torsionally connected with said disc carrier (3) and, via a locking element (31), is axially fixed on said disc carrier (3) in a manner such that said servo mechanism (10) is prestressed against said disc carrier (3) by a cup spring (13), the cup spring (13) having an radially inner circumferential edge engaging with the servo mechanism (10) and a radially outer circumferential edge engaging with said spider plate (27).

2. The clutch system according to claim 1, wherein the radially outer circumferential edge of the cup spring (13) directly engages with said spider plate (27).

3. A clutch system for a transmission with one clutch (1) comprising:
    a disc carrier (3); and
    a servo mechanism (10) situated within said disc carrier (3) and the servo mechanism (10) having dynamic pressure balance for actuating the clutch (1), a spider plate (27) supporting at least one planet shaft of a planetary gearset (26), the spider plate (27) at least partially defining a pressure balance space (15) of the dynamic pressure balance of said servo mechanism (10);
    the spider plate (27) is non-torsionally connected with the disc carrier (3) and is axially fixed to said disc carrier (3), via a locking element (31), in a manner such that the servo mechanism (10) is prestressed against the disc carrier (3) by the axial fixing of the spider plate (27); and
    one recoil spring (13) of said servo mechanism (10), which acts upon a piston (11) of said servo mechanism (10), is directly supported by a baffle plate of said pressure balance space (15) which is stationary relative to said spider plate (27), and said baffle plate is directly supported by said spider plate (27).

4. The clutch system according to claim 1, wherein said discs (2) of said clutch (1), the disc carrier (3), the servo mechanism (10) and, the pressure balance space (15), together with a pre-completed planet carrier of said planetary gearset (26), form an assembly unit which can be installed a completed assembly in the transmission, said pre-completed planet carrier having said spider plate (27), a plurality of planet shafts (33) inserted in said spider plate (27) and a planetary gear (32) supported each of said plurality of planet shafts (33).

5. The clutch system according to claim 1, wherein upon a side of said spider plate (27) facing said pressure balance space (15), a molded spacer disc (16) is situated which spatially separates said pressure balance space (15) from a lubricant chamber (25), of a planetary gear lubrication and forms said lubricant chamber (25), the molded spacer disc (16) radially outward of the at least on planet shaft, sealing engages with said spider plate (27), said molded spacer disc (16) has axially stamped corrugations distributed on a periphery thereof whose grooves (21, 20) formed by the axial stamping are connected either with said pressure balance space (15) or with said lubricant chamber (25) and a common lubricant supply (A), located in the area of the inner diameter of said molded spacer disc (16), is provided for the dynamic pressure balance of said clutch (12) and for the planetary gear lubrication of said planetary gearset (26), and lubricant for planetary gear lubrication is passed from said lubricant chamber (25) to said planetary gears via holes in said at least one planet shaft (33).

6. The clutch system according to claim 5, wherein said pressure balance space (15) is formed by the molded spacer disc (16) as an axially stationary baffle plate and by a cup-shaped section (12) of the axially movable piston (11) of said servo mechanism (10).

7. The clutch system according to claim 5, wherein said pressure balance space (15) is formed by an axially stationary wall comprising said molded spacer disc (16) and a cylindrical section (28) of said spider plate (27) and by a cup-shaped section (12) of said axially movable piston (11) of said servo mechanism (10).

8. The clutch, system according to claim 5, wherein said molded spacer disc (16) has one overflow edge (22) acting between the pressure balance space (15) and the lubricant chamber (25) and said molded spacer disc (16) is positioned relative to said common lubricant supply (A) so that a lubricant flowing on the inner diameter of said molded spacer disc (16) initially fills said pressure balance space (15) of said clutch (1) and only when said pressure balance space (15) is substantially filled is lubricant supplied via said overflow edge (22) of said molded spacer disc (16) into said lubricant chamber (25) of said planetary gear lubrication.

9. The clutch system according to claim 5, wherein said molded spacer disc (16) is disposed relative to said common lubricant supply (A) so that the lubricant flowing on an inner diameter of said molded spacer disc (16) is passed partly to said pressure balance space (15) of said clutch (1) and partly to said lubricant chamber (25) of said planetary gear lubrication.

10. The clutch system according to claim 1, wherein said pressure balance space (15) is formed by said spider plate (27) as an axially stationary wall and by cup-shaped section (12) of said axially movable piston (11) of said servo mechanism (10).

11. The clutch system according to claim 10, wherein a common lubricant supply (A) is provided for the dynamic pressure balance of said clutch (1) and for the planetary gear lubrication of said planetary gearset (26), the lubricant for said planetary gear lubrication is supplied directly from said pressure balance space (15) to said planetary gears (32) via a hole in the at least one planet shaft (33).

12. A clutch system for a transmission with one clutch (1) comprising:
   a disc carrier (3); and
   a servo mechanism (10) situated within said disc carrier (3) and the servo mechanism (10) having dynamic pressure balance for actuating the clutch (1), a spider plate (27) supporting at least one planet shaft of a planetary gearset (26), the spider plate (27) at least partially defining a pressure balance space (15) of the dynamic pressure balance of said servo mechanism (10);
   the spider plate (27) is non-torsionally connected with the disc carrier (3) and is axially fixed to said disc carrier (3), via a locking element (31), in a manner such that the servo mechanism (10) is prestressed against the disc carrier (3) by the axial fixing of the spider plate (27); and
   said locking element (31) is radially secured by an embossing (30) of said spider plate (27) for axial fixing spider plate (27) to said disc carrier (3), the embossing (30) extends in a radial direction of said locking element (31) outwardly from said locking element (31).

13. The clutch system according to claim 12, wherein a molded spacer disc (16) can be elastically, deformable so that said spider plate (27) is axially movable for assembly of said locking element (31) on said disc carrier (3), said spider plate (27) is pressed hack toward said locking element (31) by a recoil spring (13) of said servo mechanism (10) after assembly of said locking element (31).

14. The clutch system according to claim 5, wherein each said planet shaft (33) has one central hole (34) in which one diaphragm (35) is inserted.

15. The clutch system according to of claim 5, wherein each said planet shaft (33) has one central nole (34) designed as a stepped hole.

16. The clutch system according to claim 5, wherein said disc carrier (3) has at least one lubrication hole (6) situated in a hub (5) of said disc carrier (3) for the common lubricant supply (A) of the dynamic pressure balance of said clutch (1) and of said planetary gear lubrication of said planetary gear set.

17. The clutch system according to claim 1, wherein said disc carrier (3) is an outer disc carrier.

18. The clutch system according to claim 17, wherein said servo mechanism (10), during an actuation of said clutch (1), acts in direction toward said planetary gear set (26).

19. The clutch system according to claim 1, wherein said disc carrier is an inner disc carrier.

20. The clutch system according to claim 19, wherein said servo mechanism, during disengagement of said clutch, acts in direction away from said planetary gearset.

* * * * *